United States Patent
Yang et al.

(10) Patent No.: US 10,029,852 B1
(45) Date of Patent: Jul. 24, 2018

(54) TRANSPORT CHUTE AND ASSEMBLY LINE USING SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Wei-Da Yang, New Taipei (TW); Li-Quan Zhang, Shenzhen (CN); Qing Cai, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/824,583

(22) Filed: Nov. 28, 2017

(30) Foreign Application Priority Data

Aug. 15, 2017 (CN) .......................... 2017 1 0696707

(51) Int. Cl.
| | | |
|---|---|---|
| *B65G 11/00* | (2006.01) | |
| *B65G 11/12* | (2006.01) | |
| *B65G 11/08* | (2006.01) | |
| *B65G 15/28* | (2006.01) | |

(52) U.S. Cl.
CPC .......... *B65G 11/123* (2013.01); *B65G 11/086* (2013.01); *B65G 15/28* (2013.01)

(58) Field of Classification Search
CPC .... B65G 11/123; B65G 11/086; B65G 47/647
USPC ........................ 193/14, 18, 24; 198/560, 561
See application file for complete search history.

(56) References Cited

U.S. PATENT DOCUMENTS

| | | | | |
|---|---|---|---|---|
| 736,902 | A * | 8/1903 | Willson, Jr. .......... | B65G 47/00 193/18 |
| 1,418,024 | A * | 5/1922 | Rider .................... | B65G 13/00 193/18 |
| 1,542,651 | A * | 6/1925 | Alessandro .......... | B65G 47/295 193/20 |
| 1,874,343 | A * | 8/1932 | Pardee, Jr. ........... | B65G 11/088 141/359 |
| 1,921,577 | A * | 8/1933 | Nelson ............... | B65G 47/5145 193/18 |
| 2,270,083 | A * | 1/1942 | Rapp ...................... | G01G 13/00 177/DIG. 11 |
| 3,331,487 | A * | 7/1967 | Willoughby .......... | B65G 47/44 198/360 |
| 3,595,356 | A * | 7/1971 | Boje .................... | B65G 11/086 193/15 |
| 3,826,385 | A * | 7/1974 | Bluntzer ................ | B65G 65/28 414/294 |
| 4,307,800 | A * | 12/1981 | Joa .................... | A61F 13/15764 198/374 |
| 5,287,952 | A * | 2/1994 | Redaelli ............... | B65G 47/647 198/369.2 |

(Continued)

*Primary Examiner* — Joseph Dillon, Jr.
(74) *Attorney, Agent, or Firm* — ScienBiziP, P.C.

(57) ABSTRACT

A transport chute includes an upper slide defining an opening, a lower slide coupled to the upper slide, a pivoting plate pivotably coupled to the upper slide, and a resilient member coupled between the pivoting plate and the lower slide. The pivoting plate is configured to open and close the opening. The resilient member is configured to drive the pivoting plate to close the opening after the opening is opened. A workpiece is transported from the upper slide to the lower slide through the opening.

8 Claims, 3 Drawing Sheets

(56) References Cited

U.S. PATENT DOCUMENTS

| | | | | |
|---|---|---|---|---|
| 5,909,796 | A * | 6/1999 | Soldavini | B65G 47/647 198/369.2 |
| 6,062,119 | A * | 5/2000 | Overgaard | B26D 7/1818 83/165 |
| 6,557,724 | B1 * | 5/2003 | LeCroy | B65G 47/52 198/435 |
| 7,789,217 | B2 * | 9/2010 | Fischer | B65G 69/181 198/525 |
| 2002/0104736 | A1 * | 8/2002 | Peppel | B65G 47/647 198/369.2 |
| 2003/0034214 | A1 * | 2/2003 | Brown | B65G 47/647 188/313 |
| 2003/0123968 | A1 * | 7/2003 | Derenthal | B65B 23/14 414/790 |
| 2005/0202947 | A1 * | 9/2005 | Itoya | B07C 5/34 493/25 |
| 2006/0289278 | A1 * | 12/2006 | Brown | B65G 47/647 198/763 |
| 2012/0037477 | A1 * | 2/2012 | Cristoforetti | B65G 47/647 198/601 |
| 2012/0125735 | A1 * | 5/2012 | Schuitema | B65G 47/647 198/370.04 |
| 2016/0347553 | A1 * | 12/2016 | Olson | B65G 45/22 |
| 2017/0253431 | A1 * | 9/2017 | Schnarwiler | B65G 11/086 |

\* cited by examiner

ND ASSEMBLY LINE
TRANSPORT CHUTE AND ASSEMBLY LINE USING SAME

CROSS-REFERENCE TO RELATED APPLICATIONS

This application claims priority to Chinese Patent Application No. 201710696707.4 filed on Aug. 15, 2017, the contents of which are incorporated by reference herein.

FIELD

The subject matter herein generally relates to assembly lines, and more particularly to a transport chute for transporting a workpiece along the assembly line.

BACKGROUND

An assembly line may be multi-layered in order to reduce operating space. Multi-layered assembly lines may need an operator or an elevating mechanism to transport the workpiece to different layers of the assembly line.

BRIEF DESCRIPTION OF THE DRAWINGS

Implementations of the present disclosure will now be described, by way of example only, with reference to the attached figures.

DETAILED DESCRIPTION

Figure 1:
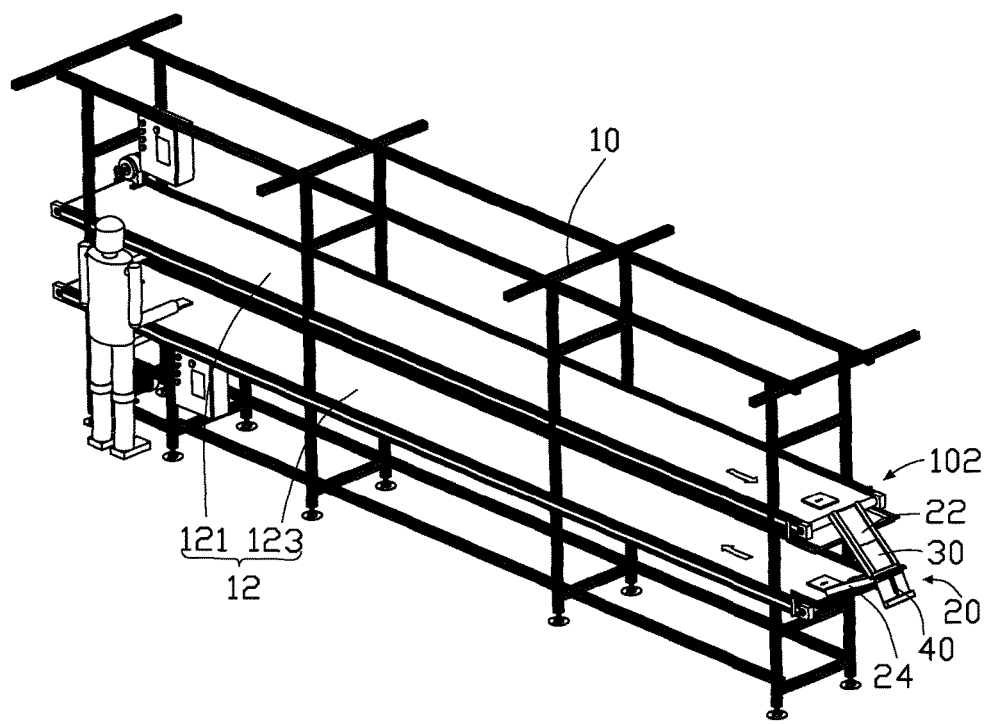
FIG. 1 is a diagram of an exemplary embodiment of a transport chute utilized in an assembly line.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected.

FIG. 1 illustrates an embodiment of an assembly line 100 including a transmission assembly 10 and a transport chute 20. The transmission assembly 10 may include a double-layered transmission belt 12. The double-layered transmission belt 12 may include an upper line 121 and a lower line 123. The upper line 121 and the lower line 123 may have different transmission direction. In the illustrated embodiment, the upper line 121 and the lower line 123 have opposite transmission directions. The transport chute 20 may be coupled to and protrude from an end portion 102 of the double-layered transmission belt 12.

The transport chute 20 may include an upper slide 22 and a lower slide 24. One end of the upper slide 22 may be coupled to the upper line 121, a second end of the upper slide 22 may be coupled to one end of the lower slide 24, and a second end of the lower slide 24 can be coupled to the lower line 123. The upper slide 22 may include a pivoting plate 30 pivotably coupled adjacent to a junction of the upper slide 22 and the lower slide 24. A resilient member 40 may be coupled between the pivoting plate 30 and the lower slide 24. The resilient member 40 may restrict a pivoting motion of the pivoting plate 30. The resilient force of the resilient member 40 may enable the pivoting plate 30 to control transport from the upper slide 22 to the lower slide 24.

Figure 2:
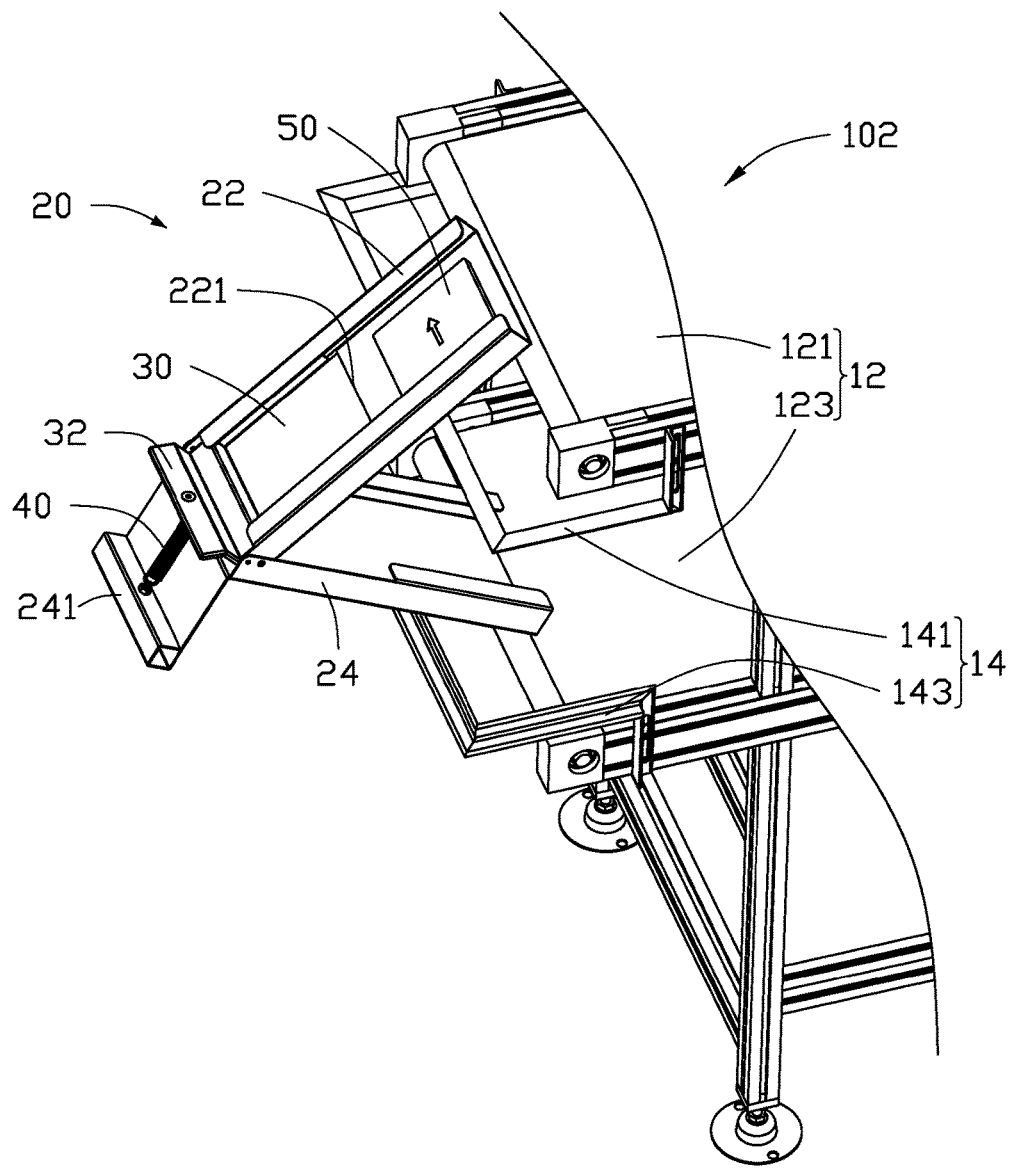
FIG. 2 is a partial enlarged view of the transport chute of FIG. 1.

Referring to FIG. 2, the transport chute 20 may further include a support frame 14 which is arranged between the upper slide 22 and the lower slide 24. The support frame 14 may include a first bracket 141 and a second bracket 143. The first bracket 141 is arranged below the end portion 102 of the upper line 121. The second bracket 143 is arranged above the end portion 102 of the lower line 123. The first bracket 141 and the second bracket 143 support the transport chute 20. The first bracket 141 and the second bracket 143 protrude from the end portion 102. The first bracket 141 supports the upper slide 22 at a downward angle from the upper line 121. The second bracket 143 supports the lower slide 24 at an upward angle from the lower line 123. A lower end of the upper slide 22 is coupled to an upper end of the lower slide 24. The first bracket 141 may be coupled to the upper line 121 and support the upper slide 22 at an angle. The second bracket 143 may be coupled to the lower line 123 and support the lower slide 24 at an angle. The upper slide 22 and the lower slide 24 may be coupled together into a "V" shape. The upper line 121 and the lower line 123 may be coupled together through the upper slide 22 and the lower slide 24.

The upper slide 22 may define an opening 221 (shown in FIG. 3) adjacent to the junction with the lower slide 24. The lower slide 24 may include a fixing plate 241. The fixing plate 241 is extended downward from the junction between the lower slide 24 and the upper slide 22. The pivoting plate 30 may pivot to open or close the opening 221. The pivoting plate 30 may include a positioning plate 32 adjacent to the junction with the lower slide 24. The positioning plate 32 is extended upward from the pivoting plate 30. The resilient member 40 may be coupled between the fixing plate 241 and the positioning plate 32. A restoring force of the resilient member 40 may cause the pivoting plate 30 to close the opening 221.

Figure 3:
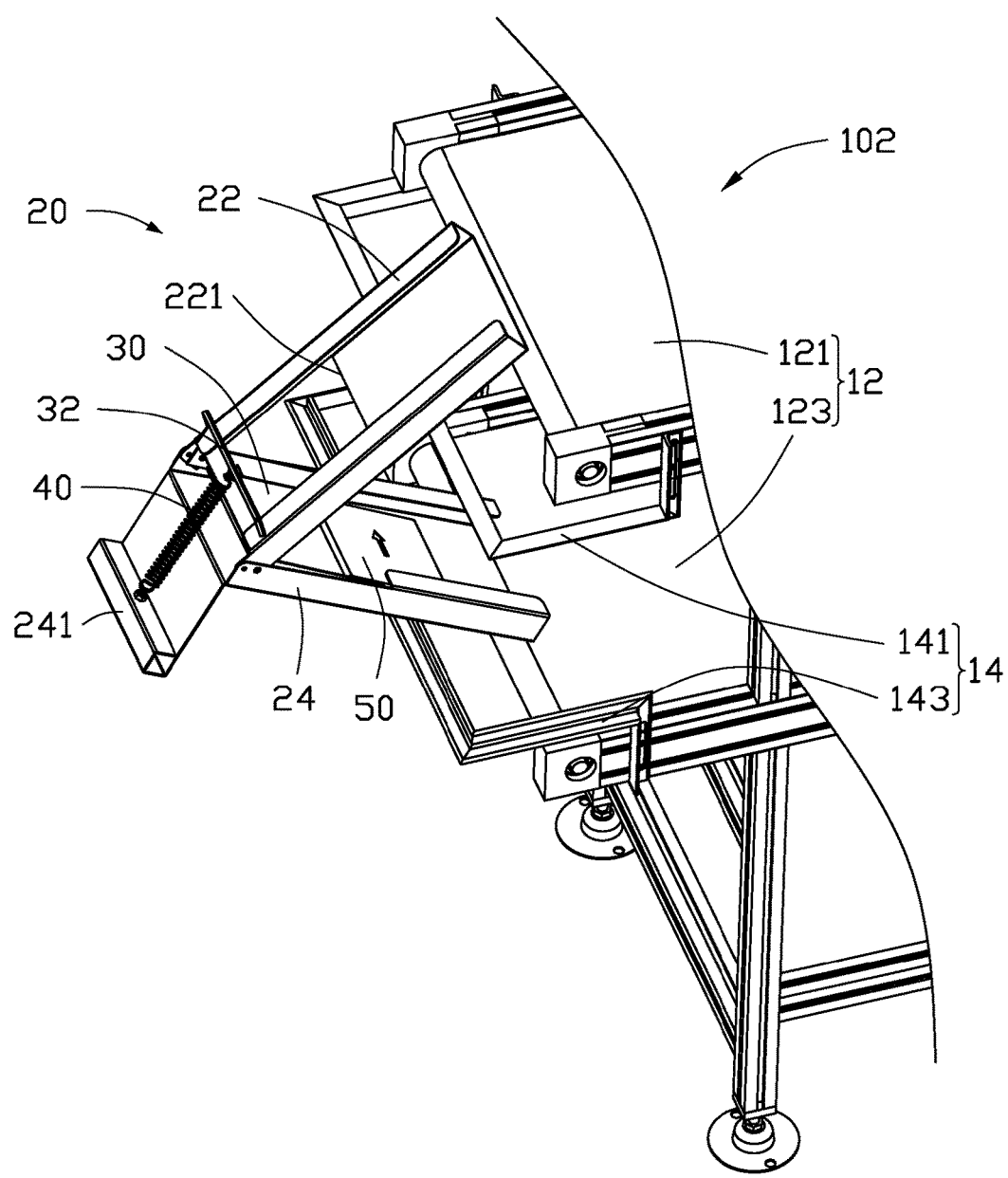
FIG. 3 is similar to FIG. 2, but shows the transport chute in another state of use.

Referring to FIG. 3, when a workpiece 50 is transported along the upper line 121 to the upper slide 22, the workpiece 50 may land on the pivoting plate 30. A weight of the workpiece 50 is greater than the restoring force of the resilient member 40, which causes the pivoting plate 30 to pivot to open the opening 221. When the opening 221 is opened by the pivoting plate 30, the workpiece 50 may slide down the lower slide 24 and land on the lower line 123. Thus, the workpiece 50 may pass from the upper slide 22, the pivoting plate 30, and the lower slide 24 to be transported from the upper line 121 to the lower line 123.

In at least one embodiment, the resilient member 40 may be a spring. When the pivoting plate 30 pivots to open the opening 221, the resilient member 40 is stretched. After the workpiece 50 slides down the lower slide 24, the restoring force of the resilient member 40 may pivot the pivoting plate 30 to close the opening 221.

The workpieces 50 may automatically flow from the upper line 121 to the lower line 123 without an operator or other transporting mechanisms. Thus, a cost of operation of the assembly line 100 is reduced and efficiency of transporting the workpieces 50 is improved.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A transport chute comprising:
   an upper slide defining an opening;
   a lower slide coupled to the upper slide;
   a pivoting plate pivotably coupled to the upper slide, the pivoting plate configured to open and close the opening; and
   a resilient member coupled between the pivoting plate and the lower slide, the resilient member configured to drive the pivoting plate to open and close the opening so as to transport a workpiece from the upper slide to the lower slide;
   wherein:
   the lower slide comprises a fixing plate extending from a junction of the upper slide and the lower slide; the pivoting plate comprises a positioning plate;
   the resilient member is coupled between the fixing plate and the positioning plate.

2. The transport chute of claim 1, wherein:
   when the workpiece lands on the pivoting plate, a weight of the workpiece causes the pivoting plate to overcome a restoring force of the resilient member to cause the pivoting plate to pivot to open the opening;
   the workpiece slides down the lower slide through the opening.

3. The transport chute of claim 2, wherein:
   the upper slide and the lower slide form a "V" shape;
   the upper slide and the lower slide are coupled to a transmission belt.

4. An assembly line comprising:
   a transmission assembly comprising a double-layered transmission belt and
   a transport chute coupled to the double-layered transmission belt, the transport chute comprising:
      an upper slide defining an opening;
         a lower slide coupled to the upper slide;
         a pivoting plate pivotably coupled to the upper slide, the pivoting plate configured to open and close the opening; and
         a resilient member coupled between the pivoting plate and the lower slide, the resilient member configured to drive the pivoting plate to open and close the opening after so as to transport a workpiece from the upper slide to the lower slide;
   wherein:
   the lower slide comprises a fixing plate extending from a junction of the upper slide and the lower slide; the pivoting plate comprises a positioning plate;
   the resilient member is coupled between the fixing plate and the positioning plate.

5. The assembly line of claim 4, wherein:
   when the workpiece lands on the pivoting plate, a weight of the pivoting plate causes the pivoting plate to overcome a restoring force of the resilient member to cause the pivoting plate to open the opening;
   the workpiece lands on the lower slide through the opening.

6. The transport chute of claim 1 further comprising a support frame comprising a first bracket and a second bracket, wherein the first bracket supports the upper slide at an angle, and the second bracket supports the lower slide at an angle.

7. The assembly line of claim 4, further comprising a support frame comprising a first bracket and a second bracket, wherein the first bracket supports the upper slide at an angle, and the second bracket supports the lower slide at an angle.

8. The assembly line of claim 7, wherein:
   the support frame is coupled to an end portion of the double-layered transmission belt; the first bracket is coupled to an upper line of the double-layered transmission belt, and the second bracket is coupled to a lower line of the double-layered transmission belt;
   the workpiece is transported along the upper line to the upper slide, and the workpiece slides down the lower slide to land on the lower line.

* * * * *